(No Model.)  6 Sheets—Sheet 1.

E. A. MARSH.
MACHINE FOR CUTTING TEETH OF DUPLEX WHEELS.

No. 323,175. Patented July 28, 1885.

Fig. 1.

Witnesses.
G. W. H. Brown
W. J. Storlow

Inventor:
E. A. Marsh
by Wight & Brown
Attys.

(No Model.) 6 Sheets—Sheet 2.
E. A. MARSH.
MACHINE FOR CUTTING TEETH OF DUPLEX WHEELS.
No. 323,175. Patented July 28, 1885.

(No Model.) 6 Sheets—Sheet 3.

E. A. MARSH.
MACHINE FOR CUTTING TEETH OF DUPLEX WHEELS.

No. 323,175. Patented July 28, 1885.

Witnesses
C. H. H. Brown
W. J. Storton

Inventor:
E. A. Marsh
by Wight & Brown
Attys.

(No Model.) 6 Sheets—Sheet 4.

E. A. MARSH.
MACHINE FOR CUTTING TEETH OF DUPLEX WHEELS.

No. 323,175. Patented July 28, 1885.

Witnesses
Inventor:
E. A. Marsh

(No Model.) 6 Sheets—Sheet 5.
E. A. MARSH.
MACHINE FOR CUTTING TEETH OF DUPLEX WHEELS.

No. 323,175. Patented July 28, 1885.

Witnesses:

Inventor:

(No Model.) 6 Sheets—Sheet 6.

E. A. MARSH.
MACHINE FOR CUTTING TEETH OF DUPLEX WHEELS.

No. 323,175. Patented July 28, 1885.

Witnesses:
Inventor:
E. A. Marsh
by Wright & Brown
Attys.

UNITED STATES PATENT OFFICE.

EDWARD A. MARSH, OF NEWTON, MASSACHUSETTS.

MACHINE FOR CUTTING TEETH OF DUPLEX WHEELS.

SPECIFICATION forming part of Letters Patent No. 323,175, dated July 28, 1885.

Application filed July 5, 1884. (No model.)

*To all whom it may concern:*

Be it known that I, EDWARD A. MARSH, of Newton, in the county of Middlesex and State of Massachusetts, have invented certain Improvements in Machines for Cutting Teeth of Duplex Wheels, of which the following is a specification.

This invention has for its object to provide an improved machine for cutting two series of gear-teeth on wheels for watch-movements, technically called "crown-wheels," and for other uses, said wheels having radial beveled teeth on one side or face, and spur-teeth cut in the periphery and coinciding with the radial teeth. The usual method of cutting watch-wheels of this kind is to secure a number of the blank-wheels on a suitable arbor secured to a spindle which carries an index properly graduated for the desired number of teeth to be cut. A suitable saw or cutter is first used to remove a portion of the metal so as to block out the desired number of peripheral or spur-teeth. After the saw has cut all the spaces it is followed by a mill or cutter which gives the required form to the spur-teeth. When all the spur-teeth have been so formed, the machine is stopped and the blanks removed from the arbor and subsequently taken to another machine, and being held by a suitable chuck have the beveled teeth cut on the side or face, so as to coincide with those previously cut on the edge. These bevel or face teeth require the two operations of sawing and shaping the same as those on the edge. When the wheel is completed, the machine is stopped while another blank is secured to the chuck, when the same operations are repeated. Inasmuch as the blanks can be cut on the edge in stacks or lots of five or more, while the face-teeth can be cut on but one blank at a time, it is obvious that a large number of machines for cutting the face-teeth will be required to equal the production of the edge-cutting machine, and also an increase of personal attendance.

My invention consists in the improved machine hereinafter described, so arranged and constructed as to complete the operations of cutting the teeth both on the edge and the face of the wheels at one handling, and that without loss of time incident to the stoppage of the machine for the purpose of securing the wheel-blanks to the chucks or arbors, the machine running continuously and performing all the operations of finishing the teeth both on the sides and edges.

Of the accompanying drawings, forming a part of this specification.

The same letters of reference indicate the same parts in all the figures.

In the drawings, $a$ represents a circular carriage or turret having a base, $b$, adapted to rotate horizontally on a suitable seat or bearing formed in the supporting-bed $c$, said seat being provided with anti-friction rollers at suitable intervals, if desired, to enable the carriage to rotate easily.

Journaled in bearings in the turret $a$ at uniform distances apart, and at points equidistant from the center of rotation of the turret, are five spindles, $d$, each having at its upper end a chuck or arbor adapted to hold a wheel-blank, $e$, to be operated on, said spindles being parallel with the axial line of the turret. At a suitable point on each spindle, preferably at the lower end, is a toothed index-wheel, $d'$, the teeth of which are the same in number as those to be formed on the wheel-blanks. Each index-wheel is normally locked by a spring-latch, $f$, supported by the turret and engaging with either of the teeth of the index-wheel, the latches being adapted to lock the index wheels and spindles in as many positions as there are teeth in the index-wheels.

The index wheels and spindles are simultaneously unlocked and partly rotated at regular intervals by the mechanism next described.

$g$ represents a vertical shaft which occupies the axial center of the turret, and is parallel with the axes of the spindles $d$, said shaft being journaled at one end in the bed $c$ and at the other end in a cap or top plate on the turret. The shaft $g$ is rotated continuously by means of a horizontal shaft, $h$, journaled in bearings in the bed $c$, and provided with a bevel pinion, $i$, meshing with a bevel-gear, $j$, on the shaft $g$, a shaft, $k$, driven by suitable power, imparting motion to the shaft $h$ by means of worm $l$ on the shaft $k$ and a worm-wheel, $l'$, on the shaft $k$.

On the continuously-rotated shaft $g$ is a sleeve, $m$, which is connected with the shaft by a feather, so that it is rotated by but is free to slide lengthwise on the shaft.

Secured to a flange, $m'$, on the sleeve $m$ are five radial arms, $m^2$, which have slots receiving attaching-screws $m^3$, said slots and screws making the arms $m^2$ radially adjustable.

Figure 1:
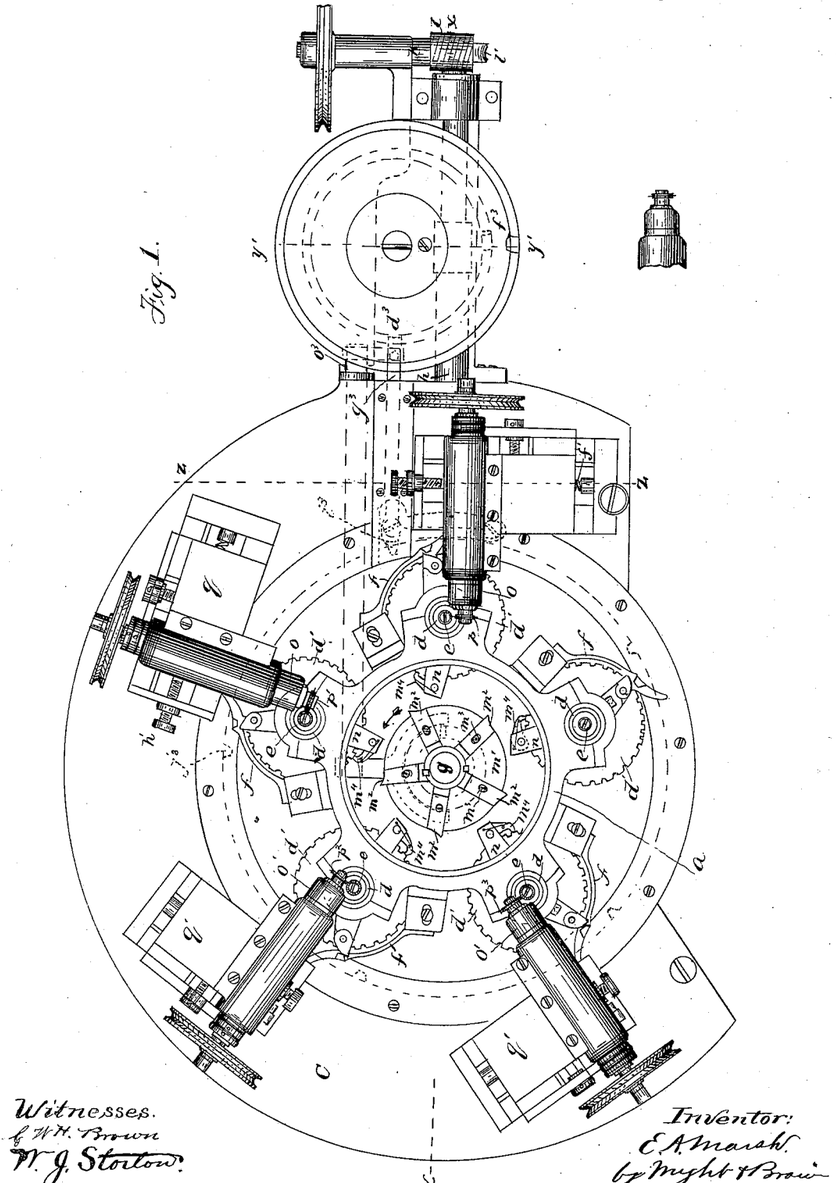
Figure 1 represents a plan view of a machine embodying my invention.
Figure 2:
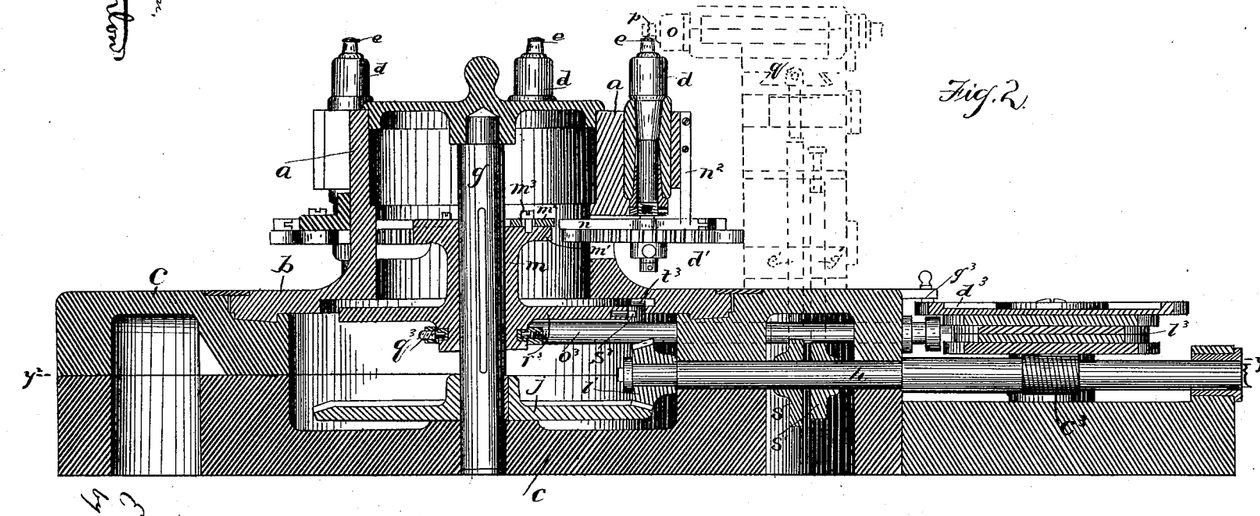
Fig. 2 represents a longitudinal section of the same on line $x\,x$, Fig. 1.

The sleeve $m$, excepting at given intervals, as hereinafter described, occupies such a position on the shaft $g$ that the arms $m^2$ rotating with said shaft will strike the inner ends of levers $n$ pivoted on the spindles $d$, and thus move or swing said levers. The levers $n$ are formed with cam-shaped or inclined outer ends adapted to bear against and displace the latches $f$ when the levers are moved by the arms $m^2$, the index-wheels being thus released. Pawls $m^4$, pivoted on the inner ends of the levers $n$, are arranged to spring into engagement with the teeth of the index-wheels at the instant that the latches are disengaged therefrom and while the levers $n$ are being moved by the arms $m^2$. Each lever $n$ is restored to its normal position by a spring, $n^2$, Fig. 2. The index wheels and spindles are thus partially rotated until the latches $f$ engage with the teeth next following those from which they were disengaged, and thus again lock the wheels and spindles, the movement thus given to each wheel being equal to the pitch of one tooth thereof. The wheel-blanks on the different spindles are therefore correspondingly rotated step by step.

Figures 3, 11:
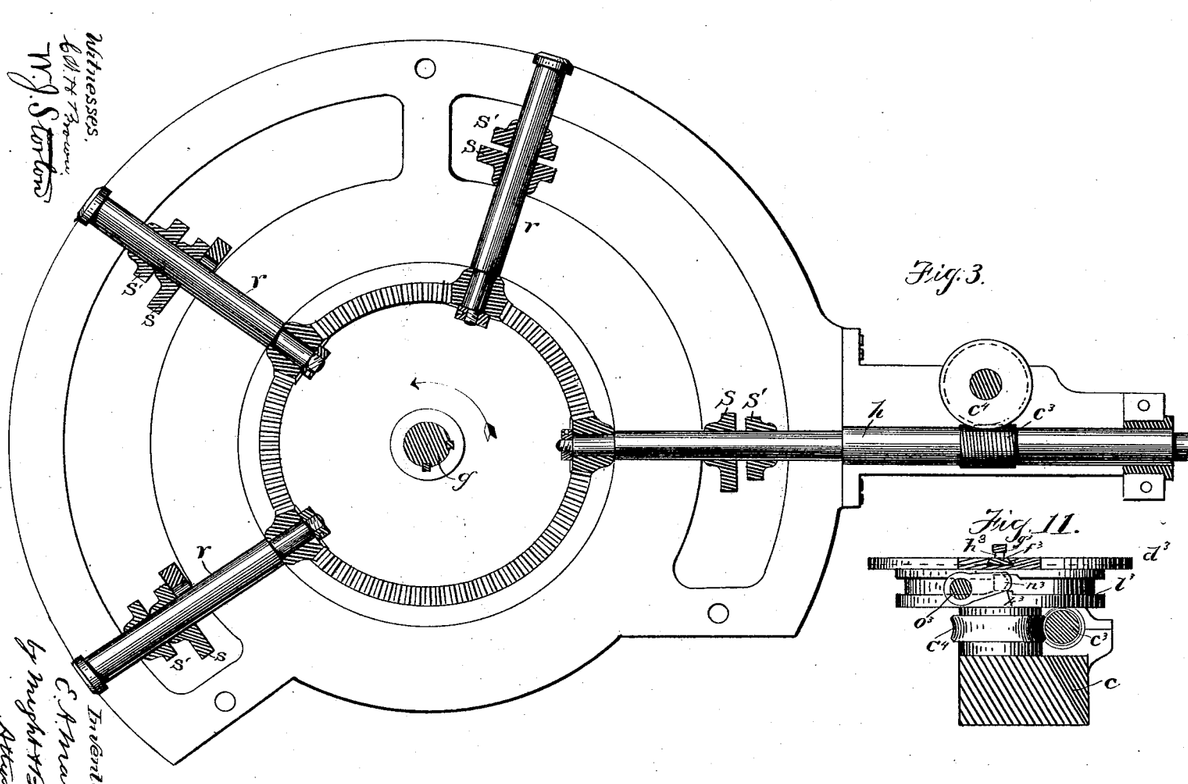
Fig. 3 represents a horizontal section on line $y^2\,y^2$, Fig. 2.
Fig. 11 represents a section on line $y\,y'$, $y\,y'$, Fig. 12, looking toward the right.
Figure 4:
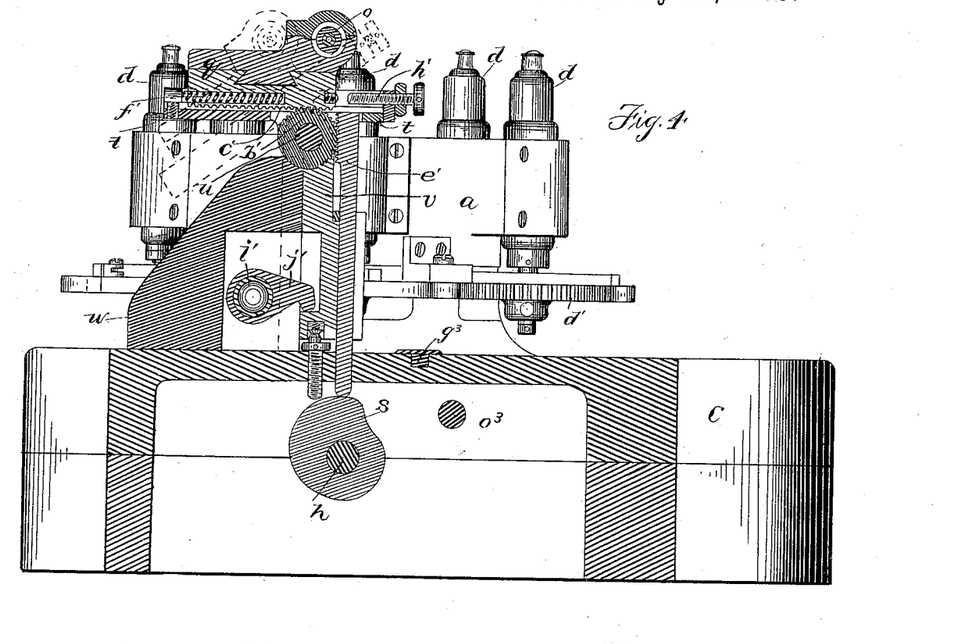
Fig. 4 represents a vertical section on line $z\,z$, Fig. 1.
Figure 5:
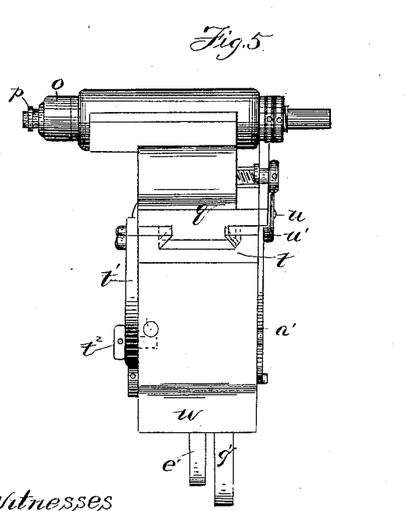
Figs. 5 and 6 represent, respectively, front and end elevations of the mechanism whereby one of the face-teeth forming cutters is supported and operated.
Figure 6:
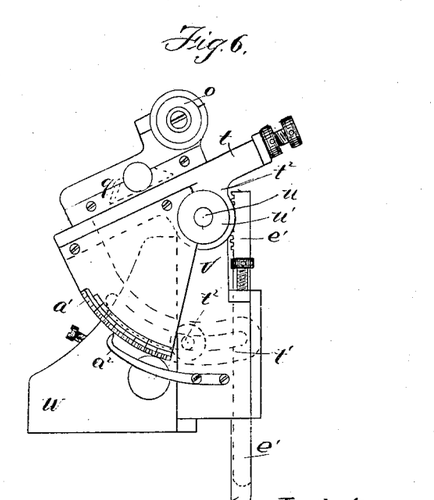
Figure 7:
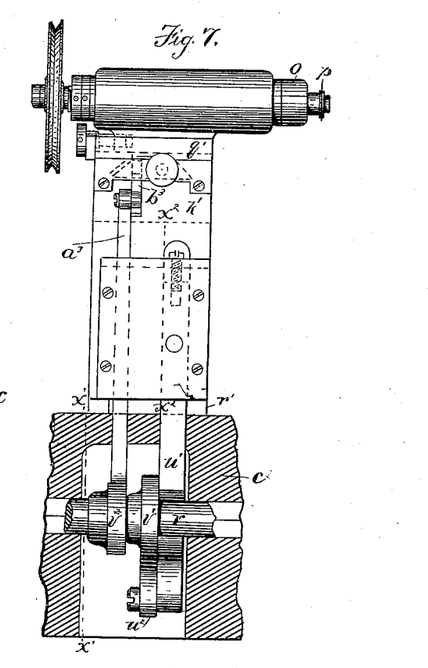
Fig. 7 represents a front elevation of the mechanism whereby one of the edge-teeth cutters is supported and operated.
Figure 8:
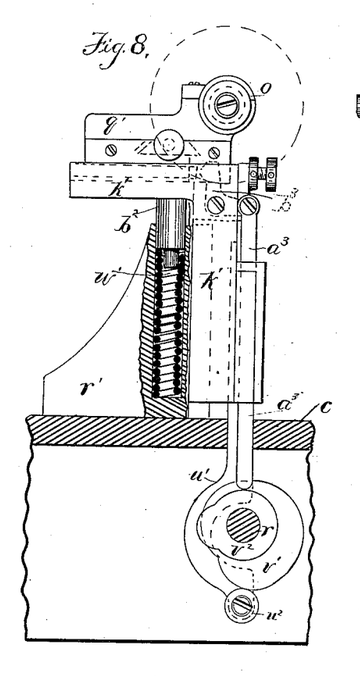
Fig. 8 represents sections on lines $x'\,x'$ and $x^2\,x^2$, Fig. 7.

$o\ o\ o'\ o'$ represent cutter-spindles provided with rotary cutters $p\ p'\ p^2\ p^3$, and mounted in carriages $q\ q\ q'\ q'$, supported by the bed $c$, said carriages being provided with operating mechanism, hereinafter described, whereby the rotating cutters are presented to the blanks on the spindles $d$ while the latter are at rest, or between each partial rotation and the next, a groove being cut in each blank after each partial rotation thereof. The spindles $o\ o$ carry the cutters which form the radial teeth on the sides of the blanks, while the spindles $o'\ o'$ carry the cutters which form the peripheral teeth. The carriage $q$, supporting the first cutter-spindle $o$, receives motion from the horizontal shaft $h$, which imparts motion to the vertical shaft, already described, and the carriages supporting the other cutter-spindles receive motion from radiating shafts $r$, journaled in bearings in the bed $c$, said shafts having bevel-pinions on their inner ends meshing with the bevel-gear $j$. The shaft $h$ and the first radiating shaft $r$ have cams $s\ s'$, actuating the carriages $q\ q$ through intemediate devices hereinafter described, the carriages being so operated that the constantly-rotating cutters move while in contact with the blanks until they have cut the desired grooves or slots in the blanks, then move away from the blanks while the latter are being partially rotated, and then return to the starting-points and cut other grooves or slots in the blanks, and so on until the blanks have been entirely acted on. The carriages $q\ q$ are alike in construction, but their cutters differ slightly in shape, the cutter $p$ being formed to block out the radial teeth, and the cutter $p'$ to complete the same. The carriages $q'\ q'$ are also alike in construction, but differ from the carriages $q\ q$, as hereinafter described, their cutters $p^2\ p^3$, respectively, blocking out and completing the peripheral teeth. Each carriage $q$ is supported by and adapted to slide between ears or guides on a guide-plate, $t$, which is connected by a joint or pivot-bolt, $u$, with a slide, $v$, adapted to move vertically in guides in a standard or support, $w$, on the base $c$. The bolt $u$ passes through ears $t^2$, Fig. 6, on the guide-plate $t$, and is rigidly attached to the slide $v$. The head of the bolt $u$ bears against one side of the guide-plate $t$, and a nut, $u'$, on said bolt bears against the opposite side of the guide-plate. By loosening said nut the guide-plate $t$ may be turned on the bolt $u$ so that it will stand horizontally or at any desired angle, as indicated by full and dotted lines in Fig. 4 and by full lines in Fig. 6, and by tightening the nut the guide-plate $t$ may be firmly secured in any position to which it may be adjusted. To additionally hold the guide-plate $t$, a segmental slotted arm, $t'$, may be attached to said plate, as shown in dotted lines in Fig. 6, a set-screw, $t^2$, passing through the slot of said arm into the slide $v$ and clamping the arm against the said slide. The guide may have a graduated plate, $a'$, which, in connection with a finger, $a^2$, affixed to the slide $v$, indicates the angle at which the guide-plate is inclined. The carriage $q$ is reciprocated on the guide-plate $t$ by means of a pinion, $b'$, adapted to rotate on the bolt $u$, and meshing with a rack, $c'$, on the carriage $q$, a rack-bar, $e'$, meshing with said pinion and bearing on the cam $s$ of the shaft $h$, and a spring, $f'$, interposed between shoulders formed respectively on the guide-plate $t$ and carriage $q$. The upward movement of the rack-bar $e'$ caused by the rotation of the cam $s$ rotates the pinion $b'$, and causes the latter to move the carriage $q$ positively against the pressure of the spring $f'$. During this movement the cutter $p$ on the spindle $o$ is acting on the wheel-blank held by the adjacent spindle $d$. When the reduced portion of the cam $s$ reaches the bar $e'$, the latter is allowed to fall, and the spring $f'$ forces the carriage $q$ in the opposite direction. At the same time the cam $s'$, located beside the cam $s$, (see Fig. 3,) acts on a bar, $g'$, Figs. 5 and 6, which is secured rigidly to the vertical slide $v$ to which the carriage is jointed, and raises said slide with the carriage, thus raising the cutter from the wheel-blank while the spring $f'$ is moving the carriage backwardly and while the wheel-blank is being partially rotated with the spindle $d$ to enable it to receive the next action of the cutter on the spindle $o$. The return backward movement of the carriage $q$, caused by the spring $f'$, is limited by an adjustable stop, $h'$, and when said movement is completed the reduced surface of the cam $s'$ allows the slide $v$ to descend with the carriage, the descent being facilitated by a spring, $i'$, in a tubular rock-shaft which is journaled in the standard or support $w$, and is provided with an arm, $j'$, bearing on a shoulder on the slide $v$, said spring exerting a constant downward pressure on the arm $j'$. The cutter being thus returned to position to commence its next slot in the wheel-blank, is again moved with the carriage $q$ by the cam $s$ and rack-bar $e'$, and so on, a slot being cut in the wheel-blank after each partial rotation thereof. It will be seen that the jointed connection of the carriage to its support and the provision of means for clamping or holding the carriage at different inclinations enables the cutter to form the radial teeth with any desired slope or bevel with relation to the peripheral teeth. It is obvious that other means may be employed for securing the carriage as adjusted and for effecting the described movements thereof. Each carriage $q'$ is supported by a slide, $k'$, adapted to move vertically in guides formed in a standard, $r'$, on the base $c$, and provided with an arm, $u'$, having a roller, $u^2$, bearing against the lower portion of the periphery of a cam, $v'$, on one of the radial shafts $r$. A spiral spring, $w'$, placed in a socket in the standard $r'$ presses upwardly against a plunger, $b^2$, on the slide $k$, and thus causes the roller $u^2$ to press upwardly against the cam $v'$. The rotation of the cam $v'$, together with the pressure of the spring $w'$, causes the slide $k'$ to reciprocate vertically, the positive downward movements caused by the action of the cam taking place while the cutter is in contact with the wheel-blank, a vertical slot being thus made in the edge of the blank. After this movement is completed, and while the spring $w'$ is raising the slide, a cam, $v^2$, raises a bar, $a^3$, which moves in a guide in the slide $k'$, and causes said bar to tilt a bell-crank lever, $b^3$, pivoted to its upper end. Said lever bears against a shoulder on the carriage $q'$ and pushes the latter horizontally, thus causing its cutter to recede from the wheel-blank during its upward movement. The wheel-blank is partially rotated while the cutter is moving upwardly, and is thus brought into position for the next action of the cutter.

A spring (not shown in the drawings) forces the carriage back to its operative position at the close of its upward movement. The cutter is then again depressed, as before, cutting another slot in the blank. This operation is repeated until all the peripheral teeth are formed.

Figure 9:
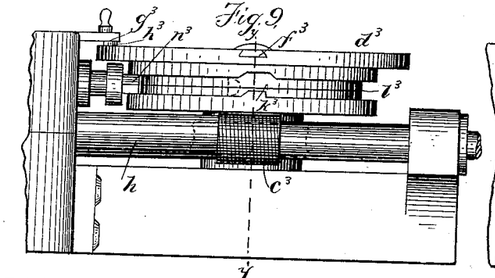
Fig. 9 represents a side elevation of the cam or count wheel and a part of its operating-shaft.
Figure 10:
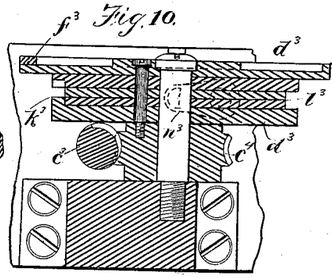
Fig. 10 represents a section on line $y'\,y'$, Figs. 1 and 9.
Figure 12:
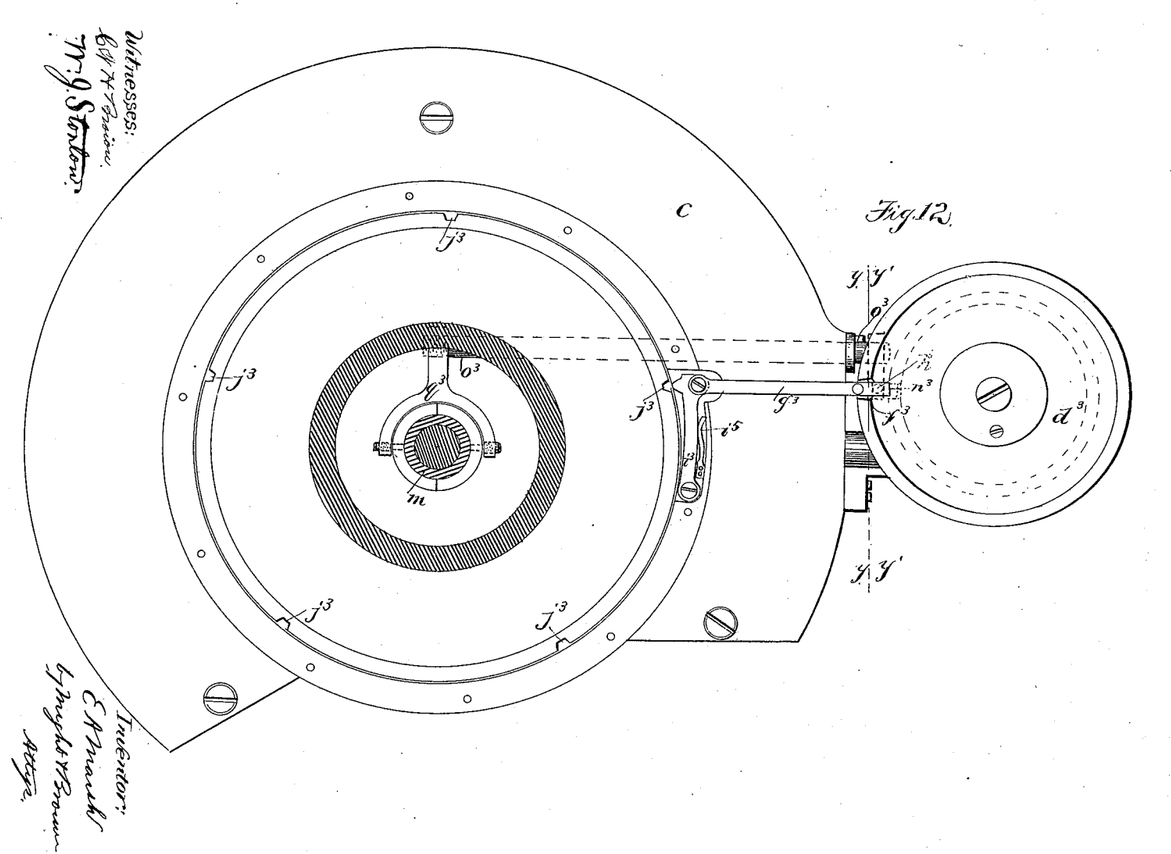
Fig. 12 represents a section on line $z'\,z'$, Fig. 2, looking downwardly, the part $r^3$ being omitted for clearness of illustration of the parts below.

From the foregoing description it will be seen that the cutters act simultaneously on the blanks, and that the blanks are rotated one step after each action of the cutters until a complete rotation of each blank has been effected, the turret $a$ meanwhile remaining motionless. After the formation of the last slot in each wheel the turret is rotated one-fifth of a complete rotation, and thus each wheel, except the one acted on and completed by the last cutter, is brought into position to receive the action of the next cutter, the completed wheel being brought into the vacant space between the last cutter, $p^3$, and the first cutter, $p$, so that it can be removed and replaced by an uncut blank. The rotation of the turret is effected as follows: Upon the shaft $h$ is a worm, $c^3$, Figs. 9, 10, and 11, meshing with a worm-wheel, $c^4$, secured to a cam or count wheel, $d^3$, which is journaled on a bearing attached to the bed $c$, and is continuously rotated by the shaft $h$. On the upper surface of the count-wheel is a cam or projection, $f^3$, extending downwardly toward the center of the wheel. A bar, $g^3$, Fig. 12, arranged to slide in a guide in the bed $c$, projects at one end over the count-wheel, and carries a roll or toe, $h^3$, through which it receives motion from projection $f^3$ of the wheel $d^3$. The other end of said bar is pivoted to a latch, $i^3$, Fig. 12, adapted to enter a notch, $j^3$, in the periphery of the base of the turret, and thus lock the turret. There are five notches, $j^3$, and they are arranged so that when either of them coincides with and receives the latch $i^3$ the wheel-blanks on the spindles are in position to be acted on by the cutters. A spring, $i^5$, Fig. 12, normally presses the latch into the notch in the base of the turret. When the wheel-blanks are ready to be moved forward by the partial rotation of the turret, the cam $f^3$ comes in contact with the roller on the bar $g^3$ and draws said bar backward, thus withdrawing the latch from the notch in the base of the turret. At the same time a cam or offset, $k^3$, Figs. 9 and 11, in a peripheral groove, $l^3$, on the count-wheel, encounters an arm, $n^3$, on one end of a rock-shaft, $o^3$, journaled in the bed $c$, and gives said rock-shaft a partial rotation. A fork, $q^3$, secured to the other end of the rock-shaft and engaged with the sleeve $m$ on the shaft $g$, is thus caused to raise said sleeve with the radiating arms $m^2$, removing the latter from the range of the levers $n$ on the index-spindles and raising a flange, $r^3$, on the sleeve $m$, so that teeth $s^3$ on said flange will engage with projections $t^3$ on the inner periphery of the base of the turret. The sleeve $m$ is thus caused to rotate the turret until the next notch, $j^3$, coincides with and receives the latch $i^3$, the turret being thus moved so as to bring the index-spindles to the position required to present the wheels to the cutters whose action they are next to receive. While the turret is rotating the index-wheels do not rotate, the arms $m^2$, which act on the levers, being raised above said levers. Simultaneously with the locking of the turret by the latch $i^3$, the rock-shaft $o^3$ is restored to its normal position by the groove $l^3$ in the count-wheel and depresses the sleeve $m$, thus disengaging the flange $r^3$ of the sleeve from the turret and bringing the radiating arms $m^2$ into position to engage the index-operating levers. The step-by-step rotation of the index-spindles is then resumed until another complete rotation of each spindle is effected. Then the turret is given another partial rotation, as before, and thus the operation is continued, each partial rotation of the turret bringing a finished wheel from the last cutter to the vacant space between the last and first cutters of the series. The entire operation is automatic, the operator or attendant having only to remove each completed wheel as it is brought into the said vacant space and replace it with a fresh blank. The mechanism is so timed that at each complete rotation of the shaft $h$, while the sleeve $m$ is in its normal position, a tooth is cut on the wheels. The partial rotation of the turret is also effected by a single rotation of the shaft $h$, so that the the time required for shifting the wheel-blanks from one position to the next is the same as that required for cutting one tooth. The number of teeth in the worm-wheel on the count-wheel is such that for a complete rotation of said wheel one rotation of the shaft $h$ more than the number of teeth to be cut in the wheels is required. This additional rotation of the shaft effects the described movement of the turret, so that the cutting of all the teeth and the removal of the wheels to their next position are effected during a single rotation of the count-wheel.

It is obvious that a single index-spindle or wheel-blank holder may be used instead of a series, such single holder being presented successively to the different cutters and rotated step by step while presented to each cutter.

I claim—

1. In a machine for cutting teeth of duplex wheels, the combination of a series of cutters of which a part are adapted to cut radial or face teeth on a wheel-blank and the others to cut peripherial teeth, a holder or a series of holders for a wheel blank or blanks, automatic mechanism for moving said holder or holders from cutter to cutter, and automatic mechanism for rotating each holder step by step while it is presented to a cutter, whereby both series of teeth are cut automatically, as set forth.

2. In a machine for cutting the teeth of duplex wheels, the combination of a series of cutters and operating mechanism therefor, substantially as described, a series of wheel-holding spindles adapted to present a series of wheels or wheel-blanks simultaneously to said cutters, mechanism for rotating said spindles on their own axes step by step, and mechanism for moving the series of spindles in unison to change the positions of the wheels, as set forth.

3. In a machine for cutting the teeth of duplex wheels, the combination of a series of cutters and operating mechanism therefor, substantially as described, a rotary carriage or turret, a series of wheel-holding spindles journaled in said turret, mechanism for rotating said spindles step by step, and mechanism alternating in its action with said spindle-rotating mechanism to partially rotate the turret after each complete rotation of the spindles and thereby move the spindles to their next position, as set forth.

4. An organized machine for cutting the teeth of duplex wheels composed of the following elements—viz: first, a series of cutters having operating mechanism, substantially as described, said cutters being arranged in circular order at uniform distances apart, excepting the first and last of the series, which are separated by a longer space; secondly, a series of wheel-holding spindles arranged to coincide with the cutters and exceeding the same in number, as specified, mechanism for rotating said spindles step by step, and mechanism for moving the series of spindles at stated intervals, whereby the spindle having the completed wheel is brought into the space between the first and last cutters, and the other spindles are brought into position to present their wheels or wheel-blanks to the several cutters for their action, as set forth.

5. An organized machine for cutting the teeth of duplex wheels comprising a series of spindles or supports for a wheel-blank normally locked and prevented from rotating, a series of cutters having operating mechanism, substantially as described, whereby they are adapted to perform the successive operations required to form the duplex teeth, mechanism for intermittently unlocking said holders and giving them step-by-step rotary movements while they are presented to the cutters, and mechanism for moving said holders bodily to advanced positions without unlocking them, as set forth.

6. In a machine for the cutting the teeth of duplex wheels, the combination of the series of cutters, operating mechanism, substantially as described, whereby said cutters are moved as required to cut the side and peripheral teeth, the rotary turret, the series of wheel-holding spindles journaled in said turret, each provided with an index-wheel, a latch therefor, and lever adapted to disengage said latch and rotate the wheel, the continuously-rotated shaft occupying the axial center of the turret, the movable sleeve on said shaft adapted when in one position to engage and move the index-wheel operating-levers, and when in another position to engage and move the turret without moving said levers, mechanism whereby said sleeve is held in its index-wheel operating position during a predetermined number of rotations, and in its turret-operating position during an additional partial rotation, and mechanism whereby the turret is locked while the index-wheels are being rotated and released preparatory to its own rotation, as set forth.

7. In a machine for cutting the teeth of duplex wheels, the combination of the cutters having operating mechanism, substantially as described, the wheel-holding spindles having index-wheels and operating-levers, the turret, the locking device therefor, the shaft $g$, having a sliding sleeve adapted to engage successively with the index-wheel levers and then with the turret, the driving-shaft geared to the shaft $g$, the count-wheel rotated by the driving-shaft and provided with cam-grooves and devices, substantially as described, operated by said cam-grooves, whereby the turret-locking device and the sliding sleeve of the shaft $g$ are operated, as set forth.

8. In a machine for cutting the teeth of duplex wheels, the combination of wheel-holding spindles, each provided with an index-wheel, a rotary support or carriage for said spindles, latches adapted to automatically lock the index-wheels, levers adapted to oscillate independently on the spindles, and each provided at one end with a nose or cam adapted to disengage the latch from the index-wheel and at the other end with a pawl adapted to engage with and rotate the index-wheel, means for moving said levers in one direction at stated periods, and springs whereby the levers are returned to their normal positions after being thus moved, as set forth.

9. In a machine for cutting the teeth of duplex wheels, the combination of a rotary cutter mounted on a slide or carriage, a guide-plate for said carriage pivoted to a support and adapted to stand horizontally or at any desired angle, means for positively holding said guide-plate in any position to which it may be adjusted, and mechanism for reciprocating said carriage on its track and for raising and lowering the track with the carriage, as set forth.

10. The combination of a slide or carriage, $q$, having a rotary cutter, the guide-plate $t$, on which said slide is adapted to reciprocate, the slide $v$, adapted to move vertically in guides in a fixed support and connected with the guide-plate $t$ by a pivot, $u$, the pinion $b'$, mounted loosely on said pivot and engaged with a rack, $c'$, on the slide, the vertical rack-bar $e'$, adapted to move in a guide in the slide $v$, and a continuously-rotated shaft having cams $s$ and $s'$, adapted to actuate the slide $v$ and bar $e'$, as set forth.

In testimony whereof I have signed my name to this specification, in the presence of two subscribing witnesses, this 25th day of June, 1884.

EDWARD A. MARSH.

Witnesses:
C. F. BROWN,
A. L. WHITE.